United States Patent
Boucher et al.

(10) Patent No.: US 9,524,138 B2
(45) Date of Patent: Dec. 20, 2016

(54) LOAD BALANCING IN A SYSTEM WITH MULTI-GRAPHICS PROCESSORS AND MULTI-DISPLAY SYSTEMS

(75) Inventors: Eric Boucher, Los Gatos, CA (US); Franck Diard, Mountain View, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 635 days.

(21) Appl. No.: 12/649,059

(22) Filed: Dec. 29, 2009

(65) Prior Publication Data

US 2011/0157193 A1 Jun. 30, 2011

(51) Int. Cl.
| | |
|---|---|
| G06F 15/16 | (2006.01) |
| G06F 15/80 | (2006.01) |
| G06T 1/20 | (2006.01) |
| G06F 3/14 | (2006.01) |
| G06F 9/50 | (2006.01) |

(52) U.S. Cl.
CPC ........... G06F 3/1438 (2013.01); G06F 9/5083 (2013.01); G06T 1/20 (2013.01); G09G 2360/06 (2013.01); G09G 2360/08 (2013.01)

(58) Field of Classification Search
CPC ........ G06F 3/1438; G06F 9/5083; G06T 1/20; G09G 2360/06; G09G 2360/08
See application file for complete search history.

(56) References Cited

U.S. PATENT DOCUMENTS

| | | | |
|---|---|---|---|
| 5,956,046 A * | 9/1999 | Kehlet et al. ................. | 345/502 |
| 6,664,968 B2 * | 12/2003 | Ono ............................. | 345/532 |
| 7,075,541 B2 * | 7/2006 | Diard ........................... | 345/505 |
| 2002/0118199 A1 * | 8/2002 | Mukherjee et al. ......... | 345/504 |
| 2006/0200751 A1 | 9/2006 | Underwood et al. | |
| 2007/0129990 A1 | 6/2007 | Tzruya et al. | |
| 2007/0257935 A1 * | 11/2007 | Koduri et al. ................ | 345/611 |
| 2009/0153540 A1 | 6/2009 | Blinzer et al. | |
| 2009/0172707 A1 | 7/2009 | Huang et al. | |

* cited by examiner

Primary Examiner — Sing-Wai Wu

(57) ABSTRACT

In typical embodiments a three GPU configuration is provided comprising three discrete video cards, each connected to a standard monitor placed horizontally for a 3× horizontal resolution. In this configuration, depending on the load on each GPU, the vertical split lines are dynamically adjusted. To adjust the load balancing according to these virtual split lines, the rendering clip rectangle of each GPU is adjusted, in order to reduce the number of pixels rendered by the heavily loaded GPU. These split lines define the boundary of the scene to be rendered by each GPU, and, according to some embodiments, may be moved horizontally. Thus for example if a GPU has a more complex rendering clip polygon to render than the other GPUs, the neighboring GPUs may render the rendering clip polygon it displays plus a portion of the rendering clip polygon to be displayed by heavily loaded GPU. The assisting GPUs transmit to the heavily loaded GPU the portion of the rendering clip polygon to be displayed by GPU via the chipset with a peer-to-peer protocol or through a communication bus. The split line is dynamically adjusted after each scene.

25 Claims, 6 Drawing Sheets

Exemplary Configuration 100

Exemplary Graphics System 500

LOAD BALANCING IN A SYSTEM WITH MULTI-GRAPHICS PROCESSORS AND MULTI-DISPLAY SYSTEMS

BACKGROUND

Graphics processing subsystems are used to perform graphics rendering in modern computing systems such as desktops, notebooks, and video game consoles, etc. Traditionally, graphics processing subsystems are implemented as either integrated graphics solutions or discrete video cards, and typically include one or more graphics processing units, or "GPUs," which are specialized processors designed to efficiently perform graphics processing operations Integrated graphics solutions are graphics processors that utilize a portion of a computer's system memory rather than having their own dedicated memory. Due to this arrangement, integrated graphics subsystems are typically localized in close proximity to, if not disposed directly upon, some portion of the main circuit board (e.g., a motherboard) of the computing system. Integrated graphics subsystems are, in general, cheaper to implement than discrete video cards, but typically have lower capability and operate at reduced performance levels relative to discrete graphics processing subsystems.

Discrete or "dedicated" video cards are distinguishable from integrated graphics solutions by having local memory dedicated for use by the graphics processing subsystem which is not shared with the underlying computer system. Commonly, discrete graphics processing subsystems are implemented on discrete circuit boards called "video cards" which include, among other components, one or more GPUs, the local memory, communication buses and various output terminals. These video cards typically interface with the main circuit board of a computing system through a standardized expansion slot such as PCI Express (PCIe) or Accelerated Graphics Port (AGP), upon which the video card may be mounted. In general, discrete graphics processing subsystems are capable of significantly higher performance levels relative to integrated graphics processing subsystems. However, discrete graphics processing subsystems also typically require their own separate power inputs, and require higher capacity power supply units to function properly. Consequently, discrete graphics processing subsystems also have higher rates of power consumption relative to integrated graphics solutions.

Some modern main circuit boards often include two or more graphics subsystems. For example, common configurations include an integrated graphics processing unit as well as one or more additional expansion slots available to add a dedicated graphics unit. Each graphics processing subsystem can and typically does have its own output terminals with one or more ports corresponding to one or more audio/visual standards (e.g., VGA, HDMI, DVI, etc.), though typically only one of the graphics processing subsystems will be running in the computing system at any one time.

Alternatively, other modern computing systems can include a main circuit board capable of simultaneously utilizing two or more GPUs (on a single card) or even two or more individual dedicated video cards to generate output to a single display. In these implementations, two or more graphics processing units (GPUs) share the workload when performing graphics processing tasks for the system, such as rendering a 3-dimensional scene. Ideally, two identical graphics cards are installed in a motherboard that contains two PCI-Express ×16 slots, set up in a "master-slave" configuration. Both cards are given the same part of the 3D scene to render, but effectively a portion of the work load is processed by the slave card and the resulting image is sent through a connector called the GPU Bridge or through a communication bus (e.g., the PCI-express bus). For example, for a typical scene, the master card renders the top half of the scene while the slave card renders the bottom half. When the slave card is done performing the rendering operations to display the scene graphically, it sends its entire output to the master card, which synchronizes and combines the two images to form one aggregated image and then outputs the final rendered scene to the display device. In recent developments, the portions of the scene rendered by the GPUs may be dynamically adjusted, to account for differences in complexity of localized portions of the scene. However, this solution is designed to improve the graphics rendering by increasing the processing capability for output on a single display, and is generally unsuitable and/or less effective for multi-display configurations.

Even more recently, configurations featuring multi-GPU systems displaying output to multiple displays have been in use. In these systems, each graphics processing subsystem (and each GPU) is individually coupled to a display device, and the operating system of the underlying computer system and its executing applications perceive the multiple subsystems as a single, combined graphics subsystem with a total resolution equal to the sum of each GPU rendered area. With the traditional multi-GPU techniques, each GPU renders a static partition of the combined scene and outputs the respective rendered part to its attached display. Typically, display monitors are placed next to each other (horizontally or vertically) to give the impression to the user that he or she uses a single large display. Each display monitor thus displays a fraction (or "frame") of the scene. Although each GPU renders its corresponding partition individually, a final synchronization among the GPUs is performed for each frame of the scene prior to the display (also known as a "present") of the scene on the display devices.

However, the complexity of each portion of a scene is often widely disparate. Thus, if each GPU renders a static partition of the screen (e.g., the specific frame accorded due to its display device), the time each GPU in the system takes to render its respective portion of the scene may vary greatly, depending on the disparity in the loads (i.e., the graphics complexity) between the GPUs. For example, in many video games, the most complex portion of a scene is typically the middle or focus of the scene. In three-display configurations, this often results in higher complexity in the portion of the scene displayed in the middle-oriented frame, and thus, a relatively heavier load for the GPU performing the rendering for the middle display relative to the peripheral displays. As a result, the graphics processing subsystems or GPUs performing the rendering for the peripheral displays will often finish rendering their respective frames of a scene before the GPU with the heavier load, and will remain idle while the heavily-loaded GPU completes the rendering for its frame of the scene, after which the frames are synchronized and then delivered individually from each GPU to its coupled display device. As the idleness may occur for every scene, this can lead to a significant inefficiency and an adverse effect on the user's graphical experience.

SUMMARY

Embodiments of the present invention are directed to provide a method and system for adaptive load balancing in a multiple GPU, multiple display system. A method is described herein that load balances the portions comprised in successive frames or scenes and rendered by multiple GPUs for display on a like number of coupled display devices. A method is also provided which allows for issuing instructions to appropriate graphics processing units to distribute processing load relatively evenly across the constituent GPUs in the system based on feedback data generated by the GPUs corresponding to previously rendered frames or scenes. By referencing feedback data after each rendered scene to facilitate the allocation of processing loads of subsequent scenes, successive loads may be balanced to reduce inefficiency due to idling GPUs and increase overall performance.

One novel embodiment receives feedback data corresponding to the rendering times of a plurality of portions of a display areas rendered in a plurality of GPUs. The feedback data for each of the plurality of GPUs is compared, and the presence of an imbalanced load is determined. If no imbalance is detected, the rendered image data is synchronized and presented in the appropriately attached displays. However, if an imbalance among the loads is determined, the GPU with the heaviest load is identified, the virtual split lines of the display area are re-partitioned, sub-portions of the rendering clip polygon with the heaviest load are removed from the load and redistributed to the GPUs with the least amount of load such that each GPU in the system is responsible for rendering a roughly equivalent load of a subsequent display area. Once the rendering is performed by the surrogate GPU, the rendered image data corresponding to the re-distributed sub-portion is copied back into the frame buffer of the originally responsible GPU. Once all data copies are performed, the frame buffers for the plurality of GPUs are synchronized, and the scene is displayed according to the frames in the corresponding display devices. Another novel embodiment enhances this method by providing instructions to the specific GPUs to render a scene according to a display area partitioned according to a load balancing process.

A novel embodiment is provided that includes multiple graphics processing units in the same computing system and each individually coupled to a display device wherein portions of a scene distributed to the graphics processing units according to frames for rendering are load balanced for successive scenes in a sequence or series of scenes. Each graphics processing unit includes a frame buffer, wherein a portion of a rendering clip polygon may be re-allocated and re-processed in a neighboring GPU and the rendered image data re-copied into the frame buffer of the heavily loaded GPU.

Each of the above described novel methods and system feature the ability to provide a load balanced, multiple-GPU, multiple-display environment in which output may be displayed to a user. In short, a user's graphical experience is more efficiently displayed in a computer system with multiple graphics processing and display resources.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
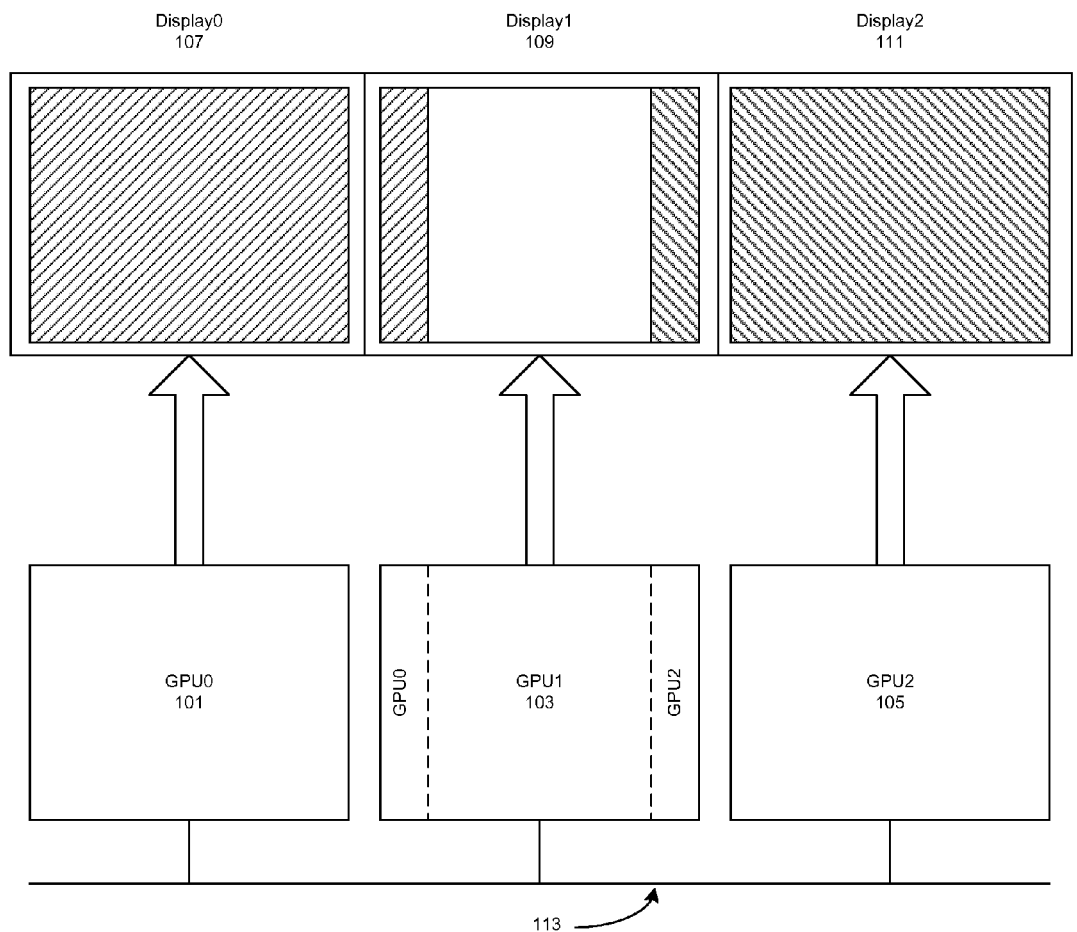
FIG. 1 depicts an exemplary distribution of virtual split lines and the corresponding display in a multi-GPU, multi-display system, in accordance with embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although steps and sequencing thereof are disclosed in figures herein (e.g., FIG. 4) describing the operations of this process, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Multiple GPU Display Configurations

According to embodiments of the claimed subject matter, a computing system including multiple graphics processing units coupled to multiple displays is provided. In typical embodiments a three GPU configuration is provided comprising three discrete video cards, each connected to a standard monitor placed horizontally for a 3x horizontal resolution. In this configuration, depending on the load on each GPU the system dynamically adjusts vertical split lines. To adjust the load balancing according to these virtual split lines, the rendering clip rectangle of each GPU is adjusted, in order to reduce the number of pixels rendered by the heavily loaded GPU. These split lines define the boundary of the scene to be rendered by each GPU, and, according to some embodiments, may be moved horizontally. Thus for example if a GPU has a more complex rendering clip polygon to render than the other GPUs, the neighboring GPUs may render the rendering clip polygon it displays plus a portion of the rendering clip polygon to be displayed by heavily loaded GPU. The assisting GPUs transmit to the heavily loaded GPU the portion of the rendering clip polygon to be displayed by GPU via the chipset with a peer-to-peer protocol or through a communication bus. In one embodiment, the split lines are dynamically adjusted after each scene.

With reference now to FIG. 1, an exemplary distribution of virtual split lines and the corresponding display in a multi-GPU, multi-display system 100 is depicted, in accordance with embodiments of the present invention. As depicted, FIG. 1 includes the three GPU configuration discussed above (e.g., GPU0 101, GPU1 103, GPU2 105) communicatively coupled to an equivalent number of display devices (e.g., Display0 107, Display1 109, Display 2 111). Display devices may comprise, for example, monitors, projection screens, laptop display panels, television screens, etc. In typical embodiments, the GPUs are also communicatively coupled to each other through a means of communication (e.g., bus 113). In some embodiments, the communication bus may comprise the PCI-e communication bus. In alternate embodiments, the means of communication may comprise a GPU-specific peer-to-peer protocol communication bus.

As presented in FIG. 1, a single scene (of a video or sequence of video graphics for example) is displayed "in three frames" across the three displays (Display0 107, Display1 109, Display 2 111). A single scene displayed in a display area comprising the sum of all three displays may be delineated by virtual "split lines" (indicated by the broken lines). These split lines indicate a plurality of vertically-oriented lines of pixels in a display. According to traditional techniques, the GPU directly coupled to a display performs the rendering for the entire frame corresponding to that display. The rendering clip polygon for each individual frame according to such a static rendering technique would thus correspond to the capability of the particular display device and/or GPU. When disparities arise due to varying complexities of one or more frames however, one or more GPUs that have finished rendering their respective portions may idle and wait for the last GPU to finish rendering. According to some embodiments of the present invention, however, this idleness may be avoided by apportioning some sub-portions of the heavy load or high intensity rendering clip polygon and performing the rendering for those sub-portions in neighboring GPUs.

According to the configuration 100 in FIG. 1, the virtual split lines of GPU0 101 and GPU2 105 are expanded to include portions of the rendering clip polygon rendered by GPU1 103. The remaining portion of the rendering clip polygon rendered by GPU1 is reduced by a commensurate amount. Those portions of GPU1 103 are then instead rendered by the neighboring GPUs (e.g., GPU0 101, GPU2 105). As shown, roughly equivalent sub-portions of the rendering clip polygon rendered by GPU1 103 are re-allocated for rendering to GPU0 and GPU2. This situation may arise when, for example, the frames to be rendered by GPU0 and GPU2 comprise substantially equivalent complexities. As presented in FIG. 1, Display1 109 also depicts the corresponding portions of the rendering clip polygon displayed that were rendered by GPUs other than the coupled GPU1 103. In typical embodiments, GPU1 103 communicates the entire rendering clip polygon depicted in Display1 by receiving the sub-portions rendered in GPU0 101 and GPU2 105 and combining the sub-portions with the portions actually rendered in GPU1 103. In further embodiments, GPU1 103 receives the externally-rendered sub-portions through the communication bus 113.

Figure 2:
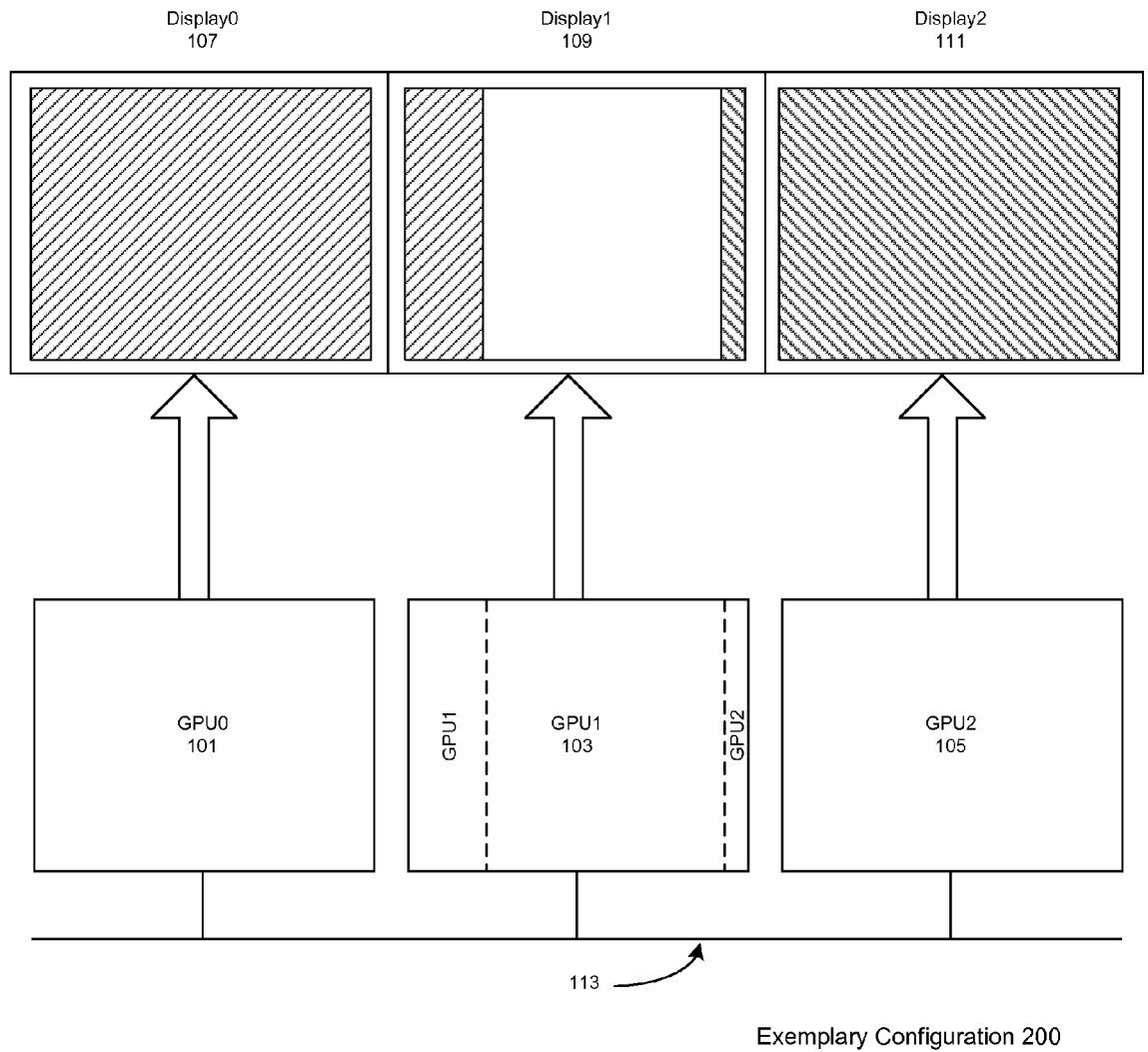
FIG. 2 depicts an exemplary distribution of virtual split lines and the corresponding display in a multi-GPU, multi-display system wherein neighboring GPUs have disproportionate contributions, in accordance with embodiments of the present invention.

With reference now to FIG. 2, an exemplary distribution of virtual split lines and the corresponding display in a multi-GPU, multi-display system wherein neighboring GPUs have disproportionate contributions is depicted, in accordance with embodiments of the present invention. FIG. 2 depicts an exemplary configuration 200 with the plurality of GPUs and displays as described above with respect to configuration 100. As shown, non-equivalent sub-portions of the rendering clip polygon rendered by GPU1 103 in FIG. 2 (indicated by the virtual split lines) are re-allocated for rendering to GPU0 and GPU2. According to the configuration 200 in FIG. 2, the virtual split lines of GPU0 101 and GPU2 105 are expanded (though incongruently) to include portions of the rendering clip polygon rendered by GPU1 103. The remaining portion of the rendering clip polygon rendered by GPU1 is reduced by a commensurate amount.

This situation may arise when, for example, the rendering clip polygon to be rendered by GPU0 is significantly less complex than the rendering clip polygon rendered by GPU2 (while both of the respective frames are still less complex than the rendering clip polygon rendered in GPU1). According to these circumstances, GPU0 may render a disproportionately larger amount of the rendering clip polygon displayed in Display1 than GPU2. As was depicted in FIG. 1, the Display1 109 of FIG. 2 also illustrates the corresponding portions of the middle rendering clip polygon displayed in Display1 that were rendered by GPUs other than the coupled GPU1 103. In typical embodiments, GPU1 103 communicates the entire rendering clip polygon depicted in Display1 by receiving the sub-portions rendered in GPU0 101 and GPU2 105 and combining the sub-portions with the portions actually rendered in GPU1 103.

Figure 3:
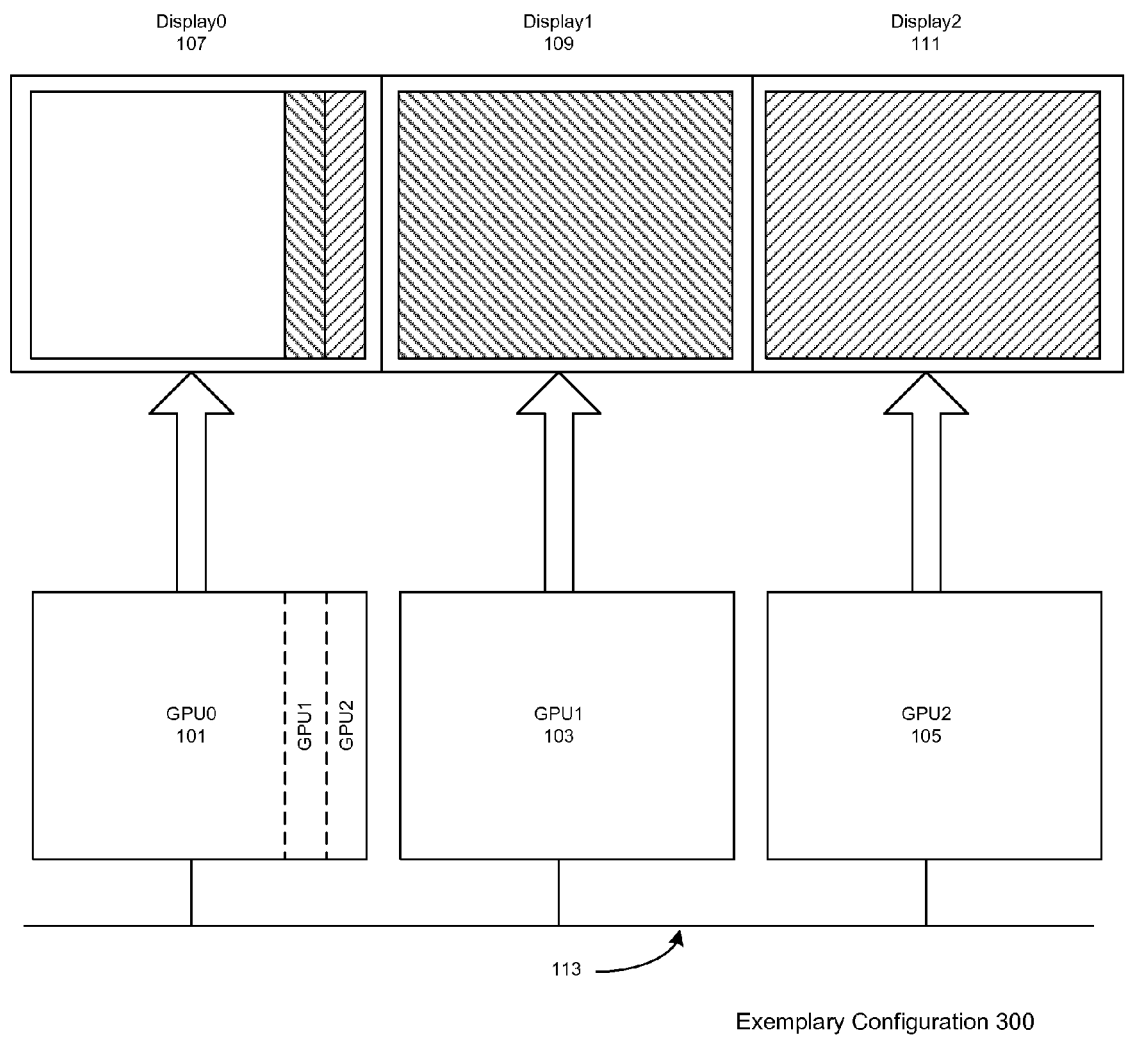
FIG. 3 depicts an alternate exemplary distribution of virtual split lines and the corresponding display in a multi-GPU, multi-display system, in accordance with embodiments of the present invention.

With reference now to FIG. 3, an alternate exemplary distribution of virtual split lines and the corresponding display in a multi-GPU, multi-display system is depicted, in accordance with embodiments of the present invention. FIG. 3 depicts an exemplary configuration 300 with the plurality of GPUs and displays as described above with respect to configurations 100, and 200. As shown, roughly equivalent sub-portions of the rendering clip polygon rendered by GPU0 101 in FIG. 3 (indicated by the virtual split lines) are re-allocated for rendering to GPU1 and GPU2. This situation may arise when, for example, the frames to be rendered by GPU1 and GPU2 comprise substantially equivalent complexities (while GPU0 is heavily-loaded). As was depicted in FIGS. 1 and 2, the Display0 107 of FIG. 3 also illustrates the corresponding portions of the left-most rendering clip polygon displayed in Display0 that were rendered by GPUs other than the coupled GPU0 101. In typical embodiments, GPU0 101 communicates the entire rendering clip polygon depicted in Display0 by receiving the sub-portions rendered in GPU1 103 and GPU2 105 and combining the sub-portions with the portions actually rendered in GPU0 101.

Adaptive Load Balancing

Figure 4:
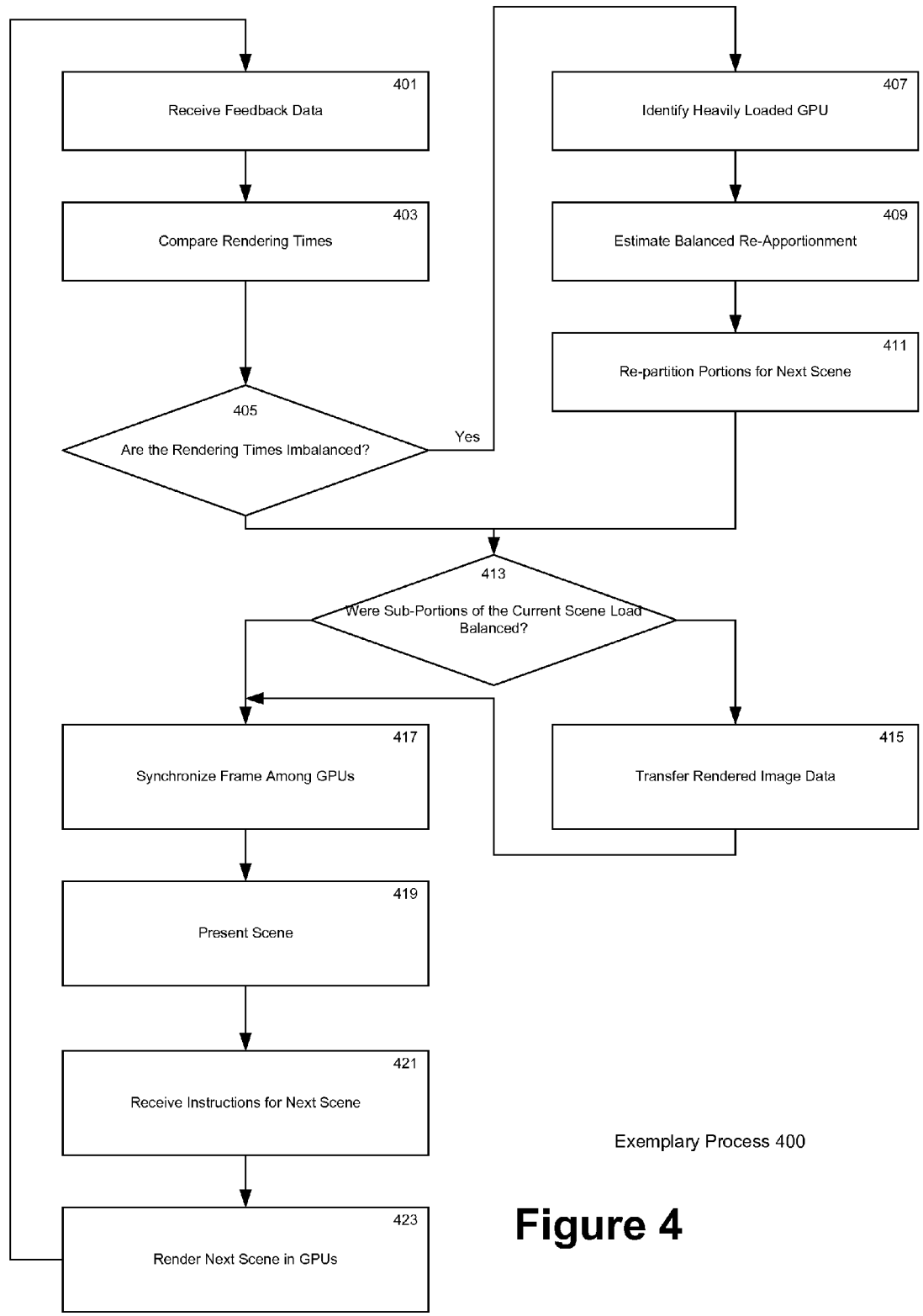
FIG. 4 depicts a flowchart of an exemplary method for adaptive load balancing in a multi-GPU, multi-display system based on received feedback data, in accordance with embodiments of the present invention.

FIG. 4 illustrates a flowchart of an exemplary method 400 for adaptive load balancing in a multi-GPU, multi-display system based on received feedback data, in accordance with embodiments of the present invention. Steps 401-423 describe exemplary steps comprising the process 400 in accordance with the various embodiments herein described. Process 400 may be performed in, for example, a system comprising one or more graphics processing subsystems individually coupled to an equivalent plurality of display devices and configured to operate in parallel to present a single contiguous display area. In further embodiments, process 400 may be implemented as a series of computer-executable instructions. In a typical embodiment, for example, a three GPU configuration is provided comprising three discrete video cards, each connected to a display device (e.g., a monitor, screen, display panel, etc.) placed horizontally. An exemplary scene to be displayed in the plurality of display devices is apportioned among the display devices by a plurality of split lines which define the rendering clip rectangles that define the respective boundaries of the portions of the scene to be rendered by each GPU for each scene. The portion of the scene displayed in a display device constitutes the "frame" of the corresponding display and GPU relationship.

At step 401, feedback data corresponding to a first scene (of a video or a series of images or processed graphics, for example) is received. In one embodiment, the first scene comprises the most recent scene displayed in the display area across a plurality of displays. In one embodiment, the feedback data may include the length of time ("rendering time") corresponding to the performance of rendering of delineated portions of the scene as distributed and rendered in a plurality of graphics processing units. In further embodiments, the rendering time for a particular clip polygon is generated by the GPU via timestamps. In still further embodiments, the rendering times (and other feedback data) may be stored in a table or other data structure and stored in the graphics memory of one or more graphics subsystems. In yet further embodiments, the particular ID of the GPU (implemented as a flag, for example) corresponding to each respective rendering time may also be included in the feedback data and/or stored in a table of other data structure.

At step 403, the feedback data (specifically, respective rendering times) received in step 401 is compared to determine the presence of an imbalance at step 405. An imbalance in rendering times may comprise, for example, significantly disparate rendering times for the most recent frame. Imbalances typically indicate a disparity in rendering loads between one or more of the plurality of the GPUs. In some embodiments, for example, an imbalance is noted when rendering times between one or more GPUs exceeds a threshold. If no imbalance (or no imbalance above a specified threshold) is detected, the process 400 proceeds directly to step 413. When an imbalance is detected, the process 400 proceeds to step 407.

At step 407, the GPU responsible for the greatest rendering time according to the feedback received at step 401 (e.g., the "heavily loaded" GPU) is identified. Identifying the heavily loaded GPU may comprise, for example, evaluating a GPU id or flag corresponding to the lengthiest rendering time stored in a table of data structure containing the feedback data. At step 409, an optimal re-apportionment of the respective virtual split lines defining the boundaries of the rendering clip polygons is estimated based on the feedback data to reduce or eliminate the disparity in rendering times achieved by every GPU in the system for a subsequent scene. In one embodiment, the subsequent scene is the scene immediately following the scene from which the feedback data is generated and received in step 401.

In typical embodiments, re-apportionment may be performed by, for example, estimating the rendering times (based on the feedback data) corresponding to portions of a frame and alternatively extending and reducing (where appropriate) the rendering clip polygons assigned to each GPU to balance the rendering times, such that one or more portions of a heavily loaded GPU may be rendered in a neighboring or surrogate GPU and subsequently transferred post-rendering back to a frame buffer of the GPU coupled to the display device corresponding to the rendering clip polygon. In still further embodiments, the process of estimating the rendering times includes accounting for the length of time required to transfer the post-rendered portions from the frame buffer of the rendering GPU back to the frame buffer of the originally responsible GPU. According to some embodiments, the respective sizes of the rendering clip polygons may be adjusted by moving vertical split lines. In alternate embodiments, either vertical or horizontal (or both) split lines defining the respective boundaries of a rendering clip polygon may be adjusted. In still further embodiments, a dampening function may be applied by restricting the movement of one or more split lines between successive frames beyond a threshold. At step 411, the display area is re-partitioned according to the estimated re-apportionment derived at step 409. That is, the virtual split lines delineating the respective rendering clip polygons may be adjusted to conform to the optimal allocation estimated in step 409.

Thus, according to typical embodiments, the load experienced in each GPU is automatically and dynamically adjusted by adjusting the vertical split lines which define the boundaries of the scene to be rendered by each GPU to balance the number of pixels rendered by each GPU. Thus for example if a GPU has a more complex rendering clip polygon to render than the other GPUs, the neighboring GPUs may render the rendering clip polygon it displays plus a portion of the rendering clip polygon to be displayed by heavily loaded GPU. At step 413, rendering performed for the current frame is evaluated to determine whether load balancing was performed for the current frame. If load balancing was performed, (e.g., steps 407-411 were performed for the current frame) the process 400 proceeds to step 415. If load balancing is determined not to have been performed, the process 400 proceeds directly to step 417.

At step 415 of FIG. 4, the assisting GPUs transmit to the formerly heavily loaded GPU the externally-rendered portion of the rendering clip polygon to be displayed by that GPU via the chipset with a peer-to-peer protocol or through a communication bus, for example. In one embodiment, transmission of the portion of the rendering clip polygon rendered in a neighboring GPU is performed by copying the data from the frame buffer of the rendering GPU into the frame buffer of the GPU coupled to the display device corresponding to the frame in which the portion is comprised.

At step 417, the frame buffers of each of the plurality of GPUs in the system are synchronized. Synchronization may be performed by, for example, verifying the image data stored in the frame buffer of a GPU corresponds to the scene displayed in the display area, and the frame to be displayed in the display device coupled to the GPU in particular. At step 419, the image data stored in the frame buffers of the GPUs of the system and synchronized at step 417 is presented in the display devices coupled to the respective GPUs. In one embodiment, each frame is transferred to the appropriate display device via control logic disposed on the video card coupled to the display device.

At step 421, rendering instructions for the next frame are received by each GPU (e.g., in a command stack). Where the process of load balancing has been performed for a previous frame, the rendering instructions may reflect a re-allocation of the rendering clip polygons inconsistent with the actual spatial orientation of the particular frames as displayed. That is, portions displayed in one frame may be rendered by a neighboring GPU (e.g., load-balanced). At step 423, the scene is rendered according to the instructions received in 421 and the process 400 is repeated for each scene in a video or sequence of graphical images. Accordingly, by adaptively load balancing the size of the rendering clip polygons for each scene, total rendering time for each scene may be reduced, idleness as a result of disparate rendering times may be eliminated thereby advantageously improving a user's experience.

Exemplary Graphics Processing Subsystems

Figure 5:
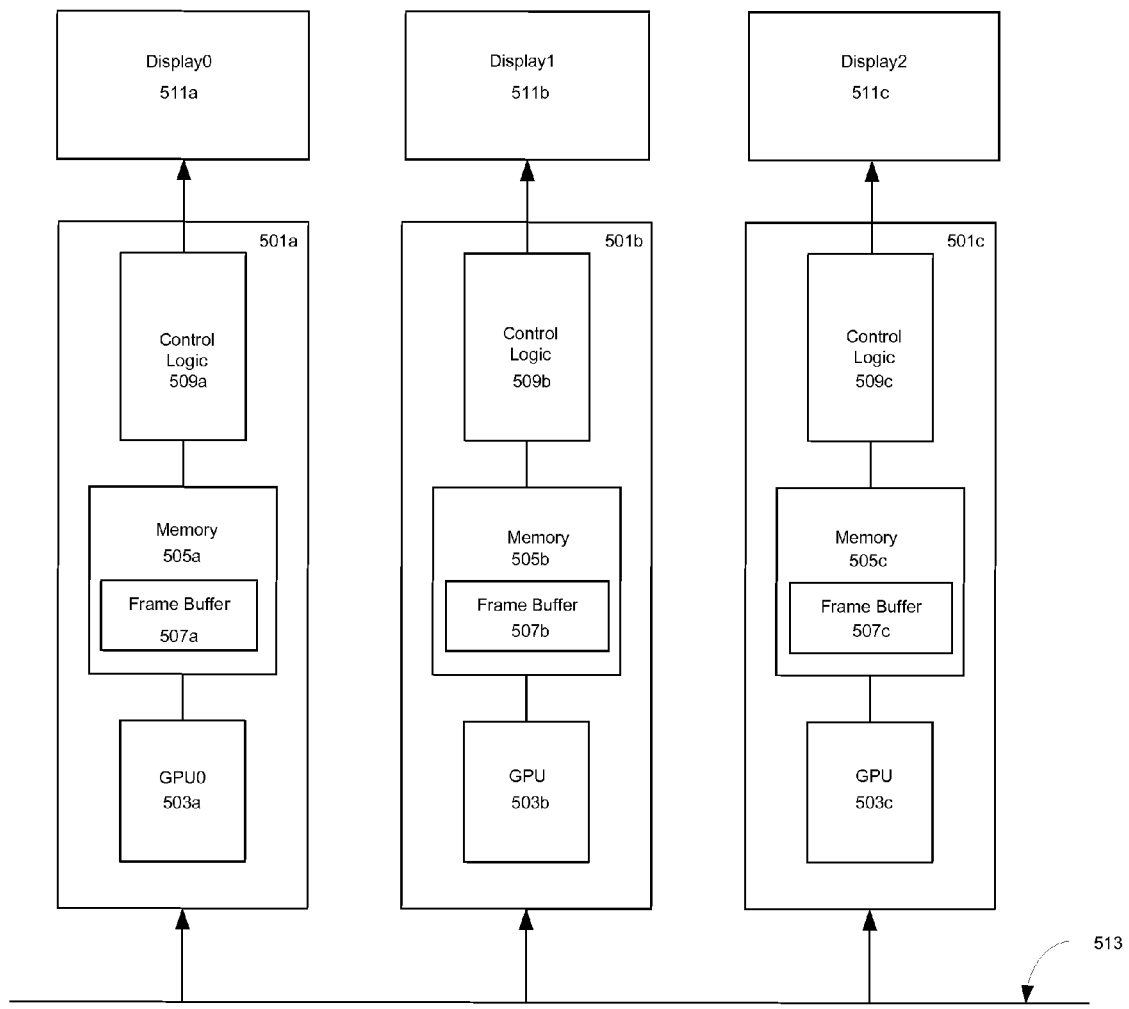
FIG. 5 depicts an exemplary graphics processing system comprising a plurality of discrete graphics processing subsystems, in accordance with embodiments of the present invention.
Figure 6:
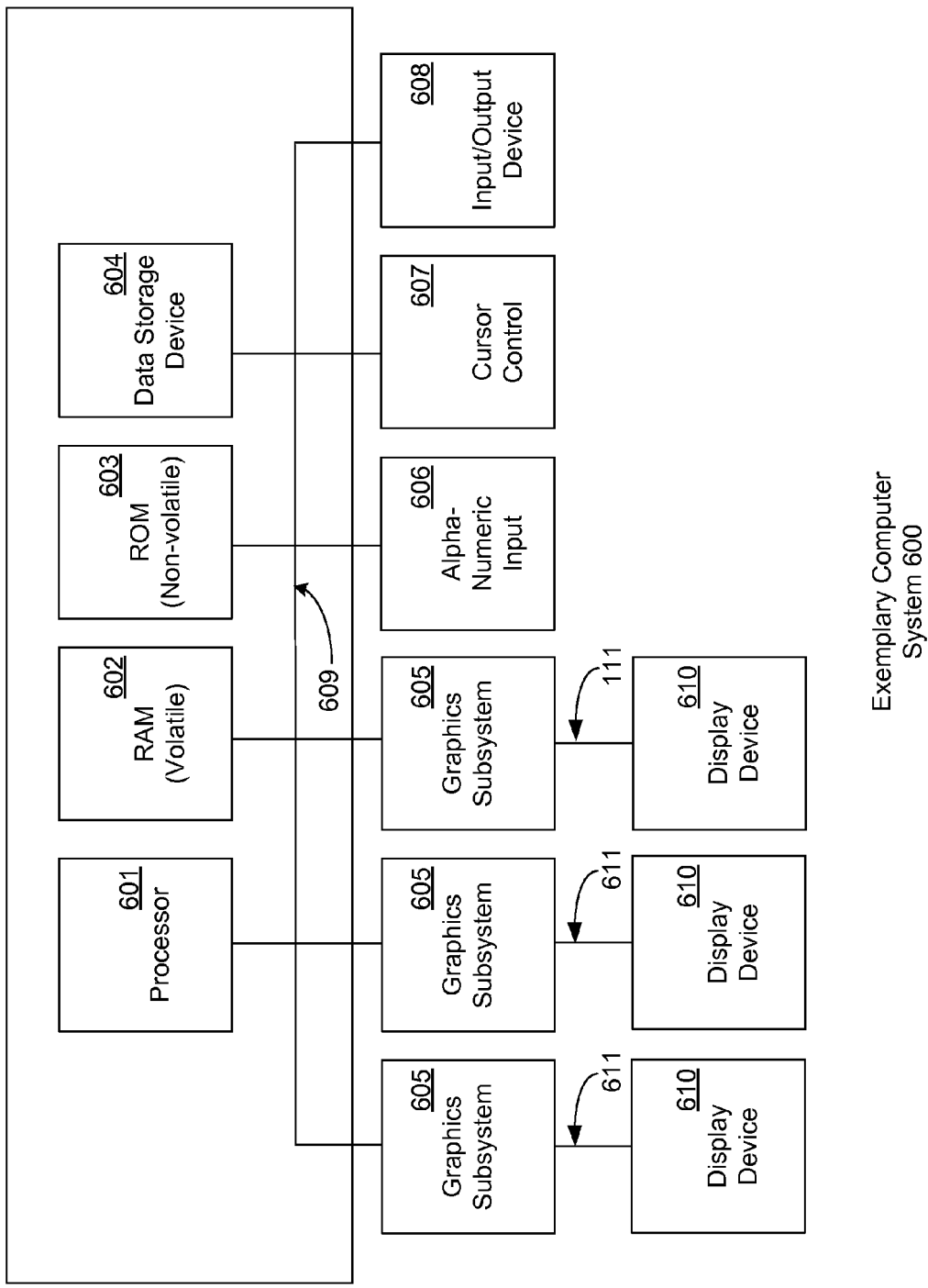
FIG. 6 depicts an exemplary computing system, in accordance with embodiments of the present invention.

FIG. 5 depicts an exemplary graphics processing system 500 comprising a plurality of discrete graphics processing subsystems, in accordance with embodiments of the present invention. As presented in FIG. 5, three graphics processing subsystems (e.g., video cards 501*a*, 501*b*, 501*c*) are interconnected by a communication bus 513 and individually coupled to a display device (e.g., Display0 511*a*, Display1, 511*b*, Display2 511*c*). However, it is to be understood that any number of cards may be included in graphics processing system 500. According to typical embodiments, communication bus 513 may be implemented to communicatively couple to other elements of a computer system (e.g., various components of system 600 as shown in FIG. 6). In alternate embodiments, communication bus 513 may also be implemented as to couple to, and transfer data among, the graphics processing subsystems only.

As depicted in FIG. 5, each graphics card includes one or more respective GPUs (e.g., GPU 503*a*, 503*b*, 503*c*) and a respective graphics memory (e.g., graphics memory 505*a*, 505*b*, 505*c*). In typical embodiments, the graphics memory also includes a frame buffer (e.g., frame buffer 507*a*, 507*b*, 507*c*). According to some embodiments, each graphics processing subsystem may also comprise control logic circuitry (e.g., control logic 509*a*, 509*b*, 509*c*) that communicates the pixel data from the local frame buffer to the locally coupled display device (e.g., control logic 509*a* communicates pixel data from frame buffer 507*a* to display0 511*a*).

In this arrangement, adaptive load balancing may be implemented, with each GPU 503*a*, 503*b*, 503*c* rendering a frame in whole or in part to its corresponding frame buffer 507*a*, 507*b*, 507*c*. When one or more GPUs are assigned disparately heavy loads (e.g., as a measure of rendering times), instructions to render a sub-portion of the rendering clip polygon assigned to the heavily loaded GPUs may be re-allocated to neighboring or surrogate GPUs to render. The remaining portion of the rendering clip polygon is rendered in the originally assigned GPU and later combined with the re-allocated sub-portions. Re-allocation may be implemented by, for example, adjusting the virtual split lines assigned to each GPU in the system.

When the number of virtual split lines assigned to a heavily-loaded GPU is reduced, the virtual split lines may be increased by one or more neighboring GPUs. The neighboring GPU then renders both its own portion as well as the re-allocated sub-portion. Once the sub-portion is rendered, the rendered image data is transferred (e.g., using a conventional block transfer operation) via bus 513 to the frame buffer of the originally assigned GPU, which then combines the sub-portion(s) rendered by its neighboring GPUs with the portion of the rendering clip polygon rendered locally to form the completed rendered rendering clip polygon. The completed rendered rendering clip polygon is then read by control logic and delivered to the appropriately coupled display device.

Exemplary Computing Device

With reference to FIG. 6, a block diagram of an exemplary computer system 600 is shown. It is appreciated that computer system 600 described herein illustrates an exemplary configuration of an operational platform upon which embodiments may be implemented. Nevertheless, other computer systems with differing configurations can also be used in place of computer system 600 within the scope of the present invention. That is, computer system 600 can include elements other than those described in conjunction with FIG. 6. Moreover, embodiments may be practiced on any system which can be configured to enable it, not just computer systems like computer system 600.

It is understood that embodiments can be practiced on many different types of computer system 600. Examples include, but are not limited to, desktop computers, workstations, servers, media servers, laptops, gaming consoles, digital televisions, PVRs, and personal digital assistants (PDAs), as well as other electronic devices with computing and data storage capabilities, such as wireless telephones, media center computers, digital video recorders, digital cameras, and digital audio playback or recording devices.

As presented in FIG. 6, an exemplary system for implementing embodiments includes a general purpose computing system environment, such as computing system 600. In its most basic configuration, computing system 600 typically includes at least one processing unit 601 and memory, and an address/data bus 609 (or other interface) for communicating information. Depending on the exact configuration and type of computing system environment, memory may be volatile (such as RAM 602), non-volatile (such as ROM 603, flash memory, etc.) or some combination of the two. Computer system 600 may also comprise one or more graphics subsystems 605 for presenting information to the computer user, e.g., by displaying information on attached display devices 610, connected by a plurality of video cables 611. As depicted in FIG. 6, three graphics subsystems 605 are individually coupled via video cable 611 to a separate display device 610. In one embodiment, process 400, 500 for adaptive load balancing may be performed, in whole or in part, by graphics subsystems 605 and displayed in attached display devices 610.

Additionally, computing system 600 may also have additional features/functionality. For example, computing system 600 may also include additional storage (removable and/or non-removable) including, but not limited to, magnetic or optical disks or tape. Such additional storage is illustrated in FIG. 6 by data storage device 604. Computer storage media includes volatile and nonvolatile, removable and non-removable media implemented in any method or technology for storage of information such as computer readable instructions, data structures, program modules or other data. RAM 602, ROM 603, and data storage device 604 are all examples of computer storage media.

Computer system 600 also comprises an optional alphanumeric input device 606, an optional cursor control or directing device 607, and one or more signal communication interfaces (input/output devices, e.g., a network interface card) 608. Optional alphanumeric input device 606 can communicate information and command selections to central processor 601. Optional cursor control or directing device 607 is coupled to bus 609 for communicating user input information and command selections to central processor 601. Signal communication interface (input/output device) 608, which is also coupled to bus 609, can be a serial port. Communication interface 609 may also include wireless communication mechanisms. Using communication interface 609, computer system 600 can be communicatively coupled to other computer systems over a communication network such as the Internet or an intranet (e.g., a local area network), or can receive data (e.g., a digital television signal).

Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. A method for load balancing display data in a system comprising a plurality of graphical processing units (GPUs) comprised in a plurality of graphics processing subsystems configured to present a contiguous display area, the method comprising:
    identifying a first GPU of a plurality of GPUs having a heavier processing load than a second GPU of the plurality of GPUs for the next scene following a first scene of a plurality of scenes based on feedback data;
    estimating a re-apportionment of a plurality of virtual split lines of a first frame of the next scene corresponding to the first GPU and a second frame of the next scene corresponding to the second GPU such that the respective loads are rendered by each of the plurality of GPUs at substantially equivalent times by removing sub-portions from the first frame and appending the sub-portions of the first frame to the second frame;
    rendering the first and second frames according to the re-apportionment, the sub-portions of the first frame being rendered in the second GPU;
    transferring the sub-portions of the first frame back to the first GPU after rendering is performed;
    combining the sub-portions of the first frame with a remaining portion of the first frame rendered in the first GPU; and
    presenting the first frame from a first control logic module comprised in a first graphics processing subsystem corresponding to the first GPU to a first display device coupled to the first GPU, and the second frame from a second frame buffer using a second control logic module comprised in a second graphics processing subsystem corresponding to the second GPU to a second display device coupled to the second GPU.

2. The method of claim 1, wherein the feedback data comprises feedback data corresponding to the first scene rendered by at least a first one of the plurality of graphics processors and a second one of the plurality of graphics processors, the feedback data comprising respective rendering times for the first and second graphics processors to render a first and second rendering clip polygons of the plurality of frames comprising the scene.

3. The method of claim 2, wherein the identifying further comprises:
    comparing the respective rendering times to determine whether an imbalance exists between respective loads of the first and second graphics processors, the respective loads corresponding to the first and second rendering clip polygons of the scene, respectively.

4. The method according to claim 1, wherein presenting the first frame to a first display device coupled to the first GPU and the second frame to a second display device coupled to the second GPU comprises:
    synchronizing the next scene among the plurality of graphics processors.

5. The method of claim 1, wherein the plurality of graphics processors comprises a plurality of frame buffers.

6. The method of claim 5, wherein the transferring image data of the appended sub-portions rendered by the plurality of graphics processors not coupled to the first display device comprises copying the image data from the frame buffers of the plurality of graphics processors not coupled to the first display device into a frame buffer of the graphics processor coupled to the first display device.

7. The method of claim 1, wherein the plurality of display devices comprises three display devices.

8. The method of claim 1, wherein the plurality of display devices are oriented to display a single contiguous horizontal display area.

9. The method of claim 1, wherein feedback data for a rendering clip polygon of a scene comprises timestamp data generated by the graphics processor rendering the portion of the rendering clip polygon.

10. The method of claim 1, wherein the estimating a re-apportionment further comprises estimating a time corresponding to the transferring of the rendered image data from the frame buffers of the plurality of graphics processors not coupled to the first display device to the frame buffer of the graphics processor coupled to the first display device.

11. The method of claim 1, further comprising applying a dampening function that restricts the estimated re-apportionment beyond a threshold.

12. The method of claim 3, wherein an imbalance is determined when a disparity between the respective rendering times exceeds a threshold.

13. The method of claim 1, wherein the transferring the plurality of sub-portions is performed via a communication bus communicatively coupling the plurality of graphics processors.

14. The method of claim 1, wherein the transferring the sub-portions of the first frame comprises transferring the sub-portion of the first frame via a chipset comprising the plurality of graphics processing units with a peer-to-peer protocol.

15. The method of claim 1, wherein the transferring the sub-portions of the first frame comprises transferring a portion of the first rendering clip polygon.

16. The method of claim 1, wherein the re-apportioning of the respective virtual split lines is performed after each scene of the plurality of scenes.

17. A load balanced graphics processing system comprising:
   a plurality of display devices;
   a plurality of graphics processors comprised in a corresponding plurality of graphics subsystems and respectively coupled to display devices of the plurality of display devices, the plurality of graphics processors being configured to operate in parallel to render a single contiguous display area apportioned by a plurality of virtual split lines into a plurality of frames corresponding to the plurality of display devices;
   a plurality of frame buffers comprised in the plurality of graphics processing subsystems for storing image data;
   a plurality of control logic modules comprised in the plurality of graphics processing subsystems for communicating pixel data from a frame buffer of a graphics processor to a display device corresponding to the graphics processors; and
   a plurality of graphics driver modules configured to determine, based on feedback data generated by the plurality of graphics processors, an imbalance between respective loads corresponding to the plurality of frame and, in response to detecting an imbalance: to redistribute a plurality of sub-portions of the frame attributed to a heavily loaded graphics processor among the other graphics processors of the plurality of graphics processors which are not the heavily loaded graphics processor for rendering, to transfer the sub-portions of the frame into a frame buffer of the heavily loaded graphics processor after rendering is performed, to combine the sub-portions of the frame with a remaining portions of the frame rendered by the heavily loaded graphics processor, and to present the plurality of frames to the plurality of display devices from the plurality of graphics processors respectively coupled to the plurality of display devices,
   wherein, the feedback data comprises a plurality of flags, each flag corresponding to a frame of the plurality of frames and identifying the corresponding GPU performing the rendering for the frame.

18. The system of claim 17, wherein the plurality of display devices comprises three display devices arranged according to a horizontal orientation.

19. The system of claim 17, wherein the plurality of display devices comprises four display devices arranged to comprise four quadrants of a single contiguous rectangular display.

20. The system of claim 17, wherein the feedback data comprises a plurality of timestamps generated by the plurality of graphics processors and corresponding to the respective rendering times for rendering the plurality of frames of the scene in the respective graphics processor of the plurality of graphics processors.

21. The system of claim 20, wherein the imbalance comprises a disparity in the respective rendering times for the plurality of frames in the plurality of graphics processors.

22. A method for load balancing display data comprising:
   in a system comprising a plurality of graphics processors comprised in a corresponding plurality of graphics processing subsystems individually coupled to an equivalent plurality of display devices and configured to operate in parallel to present a single contiguous display area apportioned by a plurality of virtual split lines corresponding to the plurality of display devices,
   rendering a plurality of frames of a scene in a plurality of graphics processors, the plurality of graphics processors comprising a first, a second and a third graphics processor
   receiving feedback data corresponding to the scene from the plurality of graphics processors, the feedback data comprising respective rendering times for the plurality of graphics processors to render corresponding frames of the scene and a flag identifying the graphics processor that performed the rendering for a frame of the scene;
   comparing the respective rendering times to determine whether an imbalance exists between respective loads of the first, second, and third graphics processors; and
   in the event that an imbalance exists:
   performing a load balancing of a second scene by rendering a sub-section of a frame corresponding to a heavily loaded graphics processor of the plurality of graphics processors in graphics processors of the plurality of graphics processors which are not the heavily loaded graphics processor;
   transferring the rendered sub-section of the frame into a frame buffer of the heavily loaded graphics processor;
   combining the sub-portion of the frame with the remaining portion of the frame rendered by the heavily loaded graphics processor
   synchronizing a plurality of frame buffers corresponding to the plurality of graphics processors; and
   presenting the plurality of frames to the plurality of display devices from a plurality of control logic modules comprises in the plurality of graphics processing subsystems respectively coupled to the plurality of display devices,
   wherein comparing the respective rendering times comprises accounting for a transfer time of the rendered sub-section from the plurality of graphics processors.

23. The method of claim 22, wherein the performing a load balancing comprises:
   identifying, based on the feedback data, which of the first, second and third graphics processors comprises a more heavily loaded graphics processor and which of the first, second and third frames comprises a more heavily loaded rendering clip polygon of the scene;
   estimating, based on the feedback data, a re-apportionment of the respective virtual split lines of the first, second and third frames of the display area for a second scene that would result in the respective loads rendered by each of the plurality of graphics processors for the first rendering clip polygon being substantially equivalent,
   re-partitioning the respective virtual split lines of the first, second, and third frames of the display area according to the estimated re-apportionment, wherein a plurality of sub-portions of the more heavily loaded rendering clip polygon of the display area and presented in a first display device coupled to the more heavily loaded graphics processor are appended to the frames rendered by the plurality of graphics processors which are not the more heavily loaded graphics processor;

receiving instructions for rendering the second scene in the plurality of graphics processors according to the estimated re-apportionment of the first scene;

rendering the second scene in the plurality of graphics processors according to the instructions; and transferring the plurality of sub-portions back to the more heavily loaded graphics processor.

24. The method of claim 23, wherein frames of the plurality of frames comprising a display area are delineated by the plurality of virtual split lines.

25. The method of claim 24, wherein the re-partitioning comprises a dampening function that restricts the estimated re-apportionment beyond a threshold.

* * * * *